UNITED STATES PATENT OFFICE.

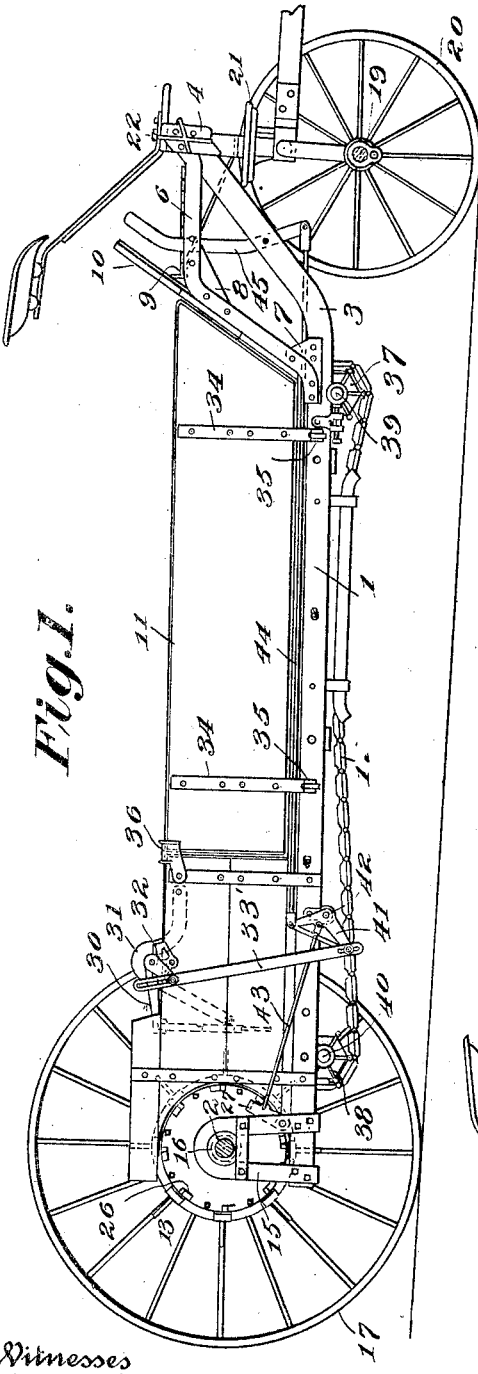

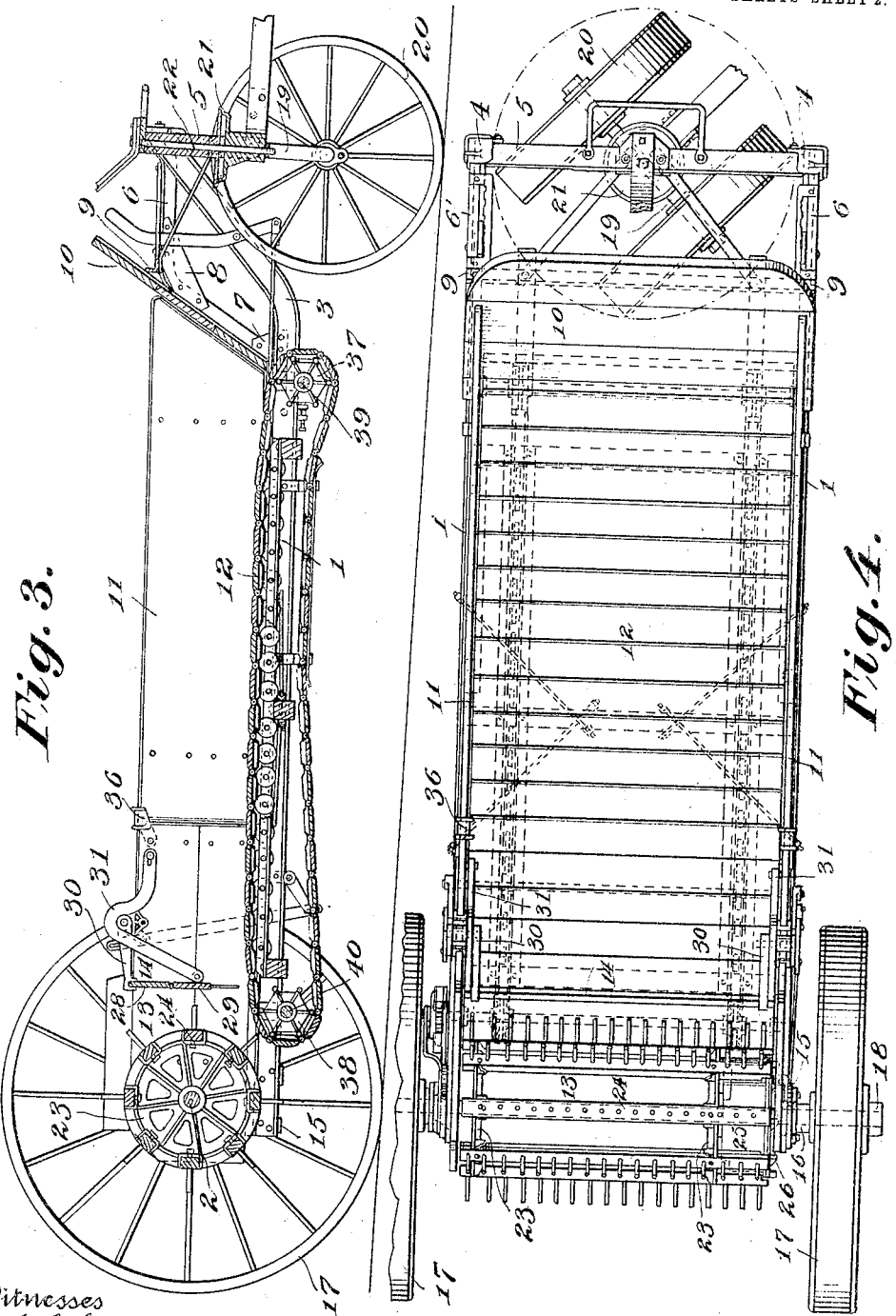

THEOPHILUS BROWN, OF MOLINE, ILLINOIS, ASSIGNOR TO MARSEILLES COMPANY, OF EAST MOLINE, ILLINOIS, A CORPORATION OF ILLINOIS.

MANURE-SPREADER.

1,112,256.  Specification of Letters Patent.  Patented Sept. 29, 1914.

Application filed November 20, 1912. Serial No. 732,552.

*To all whom it may concern:*

Be it known that I, THEOPHILUS BROWN, a citizen of the United States, residing at Moline, in the county of Rock Island and State of Illinois, have invented certain new and useful Improvements in Manure-Spreaders, of which the following is a specification, reference being had therein to the accompanying drawing.

This invention relates to improvements in manure spreaders.

The machine comprises in general a body part, a two wheel truck mounted on the front of the body in such a manner that it may be turned through an angle of 90°, rear ground wheels carrying the distributing beater and its driving mechanism and supporting the rear end of the body and the movable bottom which carries the load rearward to the beater.

In the drawings, Figure 1 is a side elevation with one rear wheel removed, viewed with the beater driving side of the machine. Fig. 2 is a side elevation with a rear wheel removed, viewed from the side opposite to that shown in Fig. 1, the front truck being turned through an angle of 90°. Fig. 3 is a vertical longitudinal sectional view. Fig. 4 is a plan view.

Referring to the drawings, the numerals 1 indicate the side sills or carrying frame of the body structure. These side sills 1 are parallel throughout their entire length and extend from a point below the rear axle 2 forward and upward in a plane inclined slightly to the horizontal. At the point 3 in front of the lower front end of the load carrying receptacle, the sills are bent upward at an angle of approximately 45°, their upper ends being secured to castings 4 carried on each end of the bolster 5. The brackets or braces 6 are connected at their forward ends to the castings 4 and extend rearward a short distance, then downward at an inclination to the side sills 1 to a point at the rear of the upwardly bent front ends. The braces 6 are secured to the sills 1 by means of the riveted plates 7. Plates 8 are riveted at the bend in the braces 6 for the purpose of further strengthening the structure. These braces, together with a cross piece 9, support the inclined front board 10 which constitutes the forward end of the load carrying chamber. The body part of the machine or load carrying chamber comprises the two side boards 11, the forwardly inclined front board 10, the movable bottom 12 and the forward portions of the distributing beater 13.

The numeral 14 indicates in general an end gate which may be positioned in front of the beater when it is desired to protect the beater from the accumulation of a tightly packed mass against its periphery during the process of loading.

The rear ends of the sills 1 extend directly beneath the rear axle 2 and are suspended from the axle by means of brackets or straps 15 which extend upward from the sills and over bearings 16 within which the rear axle is journaled. The axle 2 is supported at each end by the ground wheels 17 which are provided with ratchet devices inclosed within the hub caps 18 by means of which the axle can be driven in a forward direction only. The ratchet devices also provide an equalizing system so that in turning corners the axle will be driven only by the wheel which rotates the faster of the two.

At the front end of the machine a centrally arched axle 19 carries at each end guiding wheels 20 and at its center the fifth wheel 21. The king bolt 22 extending through the fifth wheel 21 has pivoted on its upper end the bolster 5 to which the forward ends of the sills are secured.

The beater 13, by means of which the manure is shredded and distributed in a fine layer upon the ground, is mounted concentric to the rear axle 2 and comprises the two end drums 23 and the series of tooth carrying bars 24 which are fastened around the peripheries of the drum 23. The drums 23 are journaled upon the rear axle as it is necessary that the beater not only revolve in a direction opposite to that of the axle, but also at a very much greater speed.

To provide the proper increase in speed between the axle and the beater as well as the reversal of direction, I have employed a system of transmission commonly known as planetary gearing. Such a system of gearing comprises three essential elements, namely, the driving gear, the intermediate gearing and the driven gear concentric to the driving gear. By means of this system the speed of the axle transmitted directly to the driving gear is greatly increased before reaching the driven gear which is connected to the beater, the direction of rotation being reversed. The cup-shaped casing 25 receives the entire system of gearing within its confines. Such a system of gearing is well known and is not therefore illustrated. The casing 25, forming a part of the transmission, must be free to rotate when no power is being transmitted from the driving to the driven gears but when held stationary, causes the power to be transmitted from the driving gear to the driven gear. In placing the beater driving gearing upon the axle, I have located it entirely within the confines of the beater itself by moving the beater drum 23 at this end of the beater, a distance inward from the ends of the beater bars 24 equal to the depth of the cup-shaped casing 25. By so locating the transmission entirely within the confines of the beater, either the width of the vehicle body may be increased, or the tread of the rear wheels diminished as compared with the dimensions of the machines which are now in use in which the beater driving mechanism is located entirely between the side boards and the wheels.

As it is necessary to interrupt the rotation of the intermediate member of the planetary transmission gear when it is desired to start the beater, stops or lugs 26 are formed in a circle upon the outer face of the casing cover, a dog 27 being pivoted to the bracket 15 so that it can be swung into or out of engagement with the stops.

The end gate 14, comprising the two hinged board sections 28 and 29 and the operating arms 30 and 31, is located directly in front of the beater and is of the same character as that illustrated in the Patent No. 821,779 issued to me May 29, 1906. The levers 32 are rotated through a small arc by the rods 33 and 33′ when the gate is to be raised or lowered.

To facilitate loading the body part, sections of the side boards 1 are cut away and supported by upright bars 34, the lower ends of which are hinged at 35 to the sills 1. Suitable catches 36 are mounted on the upper ends of the stationary parts of the side boards so as to engage the hinged sections and hold them securely in place when in their closed position. In loading the machine the catches 36 are slid upward and the hinged sides dropped, thus making it very much easier to fill the body part of the vehicle.

The movable bottom 12 is made up of slat sections secured to chains which rotate around forward sprocket wheels 37 and rear sprockets 38. These sprockets are carried by the transverse shafts 39 and 40, respectively, which in turn are journaled at their ends in bearings secured to the sills 1.

In feeding material to the rapidly rotating beater, the apron must necessarily be advanced rearward at a very slow speed. To provide this reduction from the axle to the apron driving shaft, I employ a combination ratchet and gear mechanism. This transmission provides a compact, simple reduction in gearing between the rotating axle and the shaft carrying the apron.

A bell crank 41 is mounted on the beater driving end of the transverse shaft 42 and is connected by means of a rod 43 to the dog 27, which starts or stops the beater driving mechanism. This transverse shaft 42 extends directly beneath the upper run of the movable apron and is mounted in suitable bearings connected to the side sills. The rod 33′ connects one end of the bell crank 41 to the gate operating lever 32. A rod 44 extends from one end of the bell crank forward to an operating lever 45. By shifting this lever from one position to another, the dog is turned into or out of engagement with the stops on the beater transmission and the end gate is raised or lowered.

In this machine I have embodied the low down type of construction with the entire load suspended between the two axles upon continuous sills extending from beneath the rear axle forward and above the front axle. By inclining the front ends of the sills I have retained the advantages of the structure in which the front wheels may be cut under in making sharp turns and have inclined the front board of the load-carrying box so that a considerable portion extends beyond the front of the apron or movable bottom. The inclination of the front board is such that the material will easily slide downward as the apron draws away the lower layers.

In the manufacture of a manure spreader embodying the low-down type of construction considerable difficulty has been found in the proper mounting of the front wheels so as to allow them to be angled off permitting of short turns without unduly increasing the wheel base of the vehicle. In some of the machines this difficulty has been overcome by using a single front caster wheel which may be mounted well within the frame of the vehicle close to the front board. In other types the angle of turning has been considerably lessened in order that the wheel base of the vehicle may not be unduly lengthened. The disadvantage of the prior construction referred to is that the ground contact surface is greatly reduced which is a disadvantage in a vehicle carrying heavy loads and the stability of the vehicle is likewise greatly lessened.

By the combination of an inclined front board and continuous parallel sills, I have made it possible to retain in a low-down type of machine the advantages of a front truck which may be swung through an angle of 90 degrees permitting the vehicle to turn about one rear wheel as a pivot, and, at the same time, have extended the load carrying space forward at a place where it will not interfere with the under-cut of the wheels and likewise not necessitate the increase of the apron length.

In a vehicle of this type in which a soggy, heavy mass is to be carried, the frame must be of a very rigid construction. By employing the continuous sills extending upward from the front of the load carrying body to points above the front wheels, it is necessary to make a bend in the continuous sills or channels, this consequently weakening the structure. To obviate this and provide a rigid frame, I used braces 6 which extend from the forward ends of the sills rearward to points behind the bends in the sills. This materially strengthens the sill structure and likewise provides a support for the front inclined load carrying board 10.

To maintain the maximum strength of framework the side sills 1 are carried up in substantially the same planes in which the rear parts lie. The front ends are strongly tied together by straight bracing which is so related to the truck that the latter can rotate completely within the framework so provided without striking any of the parts. The side braces are so arranged as to give support to the front vehicle board at its strong forward inclination. When the load is piled, as is intended in using this construction, there is much weight exerted upon the board especially when the manure is of the heavy moist class. This strain is met by the brace shaped in the peculiar way shown. The braces and the board itself are so placed as to economize space in relation to the wheels which, when turning, can cut under to an angle of 90° and not interfere with the parts of the body.

The parallel sills 1, which support the body structure and the movable apron instead of being in a horizontal plane parallel to the ground surface, are slightly inclined from points beneath the rear axle forward and upward as they approach the point 3 at which they are bent upward at approximately 45°. The movable apron being mounted on the sills is consequently inclined in such a manner that the tendency of the load due to the action of gravity will be to assist the apron driving mechanism rather than oppose it. This has been found to be a feature of very considerable importance in actual practice.

The material advantages incident to the mechanism herein shown resulted from the experience met with in making and using machines of the character shown in my earlier patent, Re-issue No. 13,318. I found it necessary to devise means for carrying a large load on a short wheel base; to provide a strong rigid sub-structure for the load-carying part of the body; to so arrange the parts there should be a strong bracing for the front portion of the load; and further so that there would be capability of turning completely around in a short space without being driven to the necessity of employing a single centrally arranged truck wheel at the front. While retaining the relatively high ground wheels to provide for the proper traction and the proper speed of the beater I succeeded in positioning the two relatively low front wheels (spaced apart on the front axle) in relation to the main sills, to the forwardly inclined load support and to the supplemental braces, in such way that the wheel base could be shortened, the front truck was relieved of the torsions and strains incident to a single central steering wheel and yet was freely turnable to such degree that the front axle can be carried from a position parallel, to a position perpendicular, to the transverse lines of the body, the latter having a wide supporting sub-structure at the front end. The load can be piled forward so that when the first draft impulse is exerted by the team, resistance from the rear wheels is reduced; but at the same time the parts are so relatively disposed that the weight is speedily transmitted to the rear wheels to increase their tractive efficiency as soon as the beater is to be put in operation and insure its proper rotation. As the bottom part of the load moves backward the forward part slides down the front inclined board, and, gradually, a uniformly thick load stratum is formed on the apron.

What I claim is:

1. The combination of the rear axle, the front axle, the high rear ground wheels on the rear axle, the two relatively low front wheels spaced apart on the front axle, the main sills below and suspended from the rear axle and extending forward on lines substantially parallel with each other from end to end to points above the front axle, each having a lower elongated section and an upward and forward inclined section, a load-supporting-and-delivering apron, a load-carrying body supported on said sills and having a forward and upward inclined front end wall arranged to support a portion of the load in front of the front end of the apron, a rotary distributer at the rear end of the apron, the elongated cross bolster secured to the front ends of the said parallel sills, and the horizontally swinging carrier for the front axle supported by the said bolster, the aforesaid parts being arranged substantially as set forth to permit the axle to turn from a position perpendicular, to a position parallel, to the longitudinal lines of the vehicle without the front wheels impinging upon the said sills.

2. The combination of the relatively long rear axle, the relatively short front axle, the relatively high rear ground wheels carried by the rear axle, the relatively low front wheels on the front axle, the main sills below and suspended from the rear axle and extending forward to points above the front wheels and lying continuously in the same longitudinal vertical planes and inclined upward at their front ends, a load-carrying body supported on said sills and having a forward and upward inclined front end wall, a load-supporting-and-delivering apron at the bottom of the body, a rotary distributer on the rear axle, the angled braces rigid with and bearing against the inclined front end wall and extending from the front lower corners of the body upward and forward to the ends of the main sills, the long cross bolster secured to said sills and braces, the rotary carrier for the front axle positioned to permit it to turn from a position parallel, to a position at right angles, to the transverse lines of the body without impinging on the said sills or braces, substantially as set forth.

In testimony whereof I affix my signature, in presence of two witnesses.

THEOPHILUS BROWN.

Witnesses:
 FLOYD R. TODD,
 G. P. EXTROM.